United States Patent
Okano (10) Patent No.: US 6,573,825 B1
(45) Date of Patent: Jun. 3, 2003

(54) COMMUNICATION APPARATUS AND ALERTING METHOD

(75) Inventor: Yoichi Okano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,780

(22) Filed: Dec. 27, 1999

(30) Foreign Application Priority Data

Dec. 25, 1998 (JP) .............................. 10-368799

(51) Int. Cl.$^7$ ................................................ G08B 5/22
(52) U.S. Cl. ...................... 340/7.51; 340/7.57; 340/7.62
(58) Field of Search ................................. 340/7.55, 7.62, 340/825.49, 426, 430, 7.2, 7.57, 7.48, 7.39, 7.51, 7.41, 7.35, 7.6; 379/179, 244, 253; 455/404, 422

(56) References Cited

U.S. PATENT DOCUMENTS

| | | | |
|---|---|---|---|
| 5,247,564 A | * 9/1993 | Zicker | 340/426 |
| 5,394,140 A | * 2/1995 | Wong et al. | 340/7.48 |
| 5,442,692 A | * 8/1995 | Yamazaki et al. | 379/253 |
| 5,504,476 A | * 4/1996 | Marrs et al. | 340/7.48 |
| 5,574,999 A | * 11/1996 | Gropper | 455/186.1 |
| 6,011,967 A | * 1/2000 | Wieck | 455/404 |
| 6,075,456 A | * 6/2000 | Park | 340/7.55 |

FOREIGN PATENT DOCUMENTS

| | | |
|---|---|---|
| JP | 5-110636 | 4/1993 |
| JP | 9-289665 | 11/1997 |
| JP | 11-13507 | 1/1998 |
| JP | 10-233822 | 9/1998 |
| JP | 10-233833 | 9/1998 |

* cited by examiner

*Primary Examiner*—Van Trieu
(74) *Attorney, Agent, or Firm*—Scully, Scott, Murphy & Presser (57) ABSTRACT

A communication apparatus allowing easy setting operation of alerting mode and a high degree of flexibility in setting an alerting mode. A character-scale table contains scale note data associated with each of numeric characters. One of a first alerting mode and a second alerting mode can be selected by a user. The first alerting mode provides an alerting pattern which is determined by referring to the character-scale table depending on the source identification number. The second alerting mode provides a preset alerting pattern. When the incoming call does not include the source identification number, an alerting device operates in the second alerting mode. When the incoming call includes the source identification number, the alerting device operates in a selected one of the first alerting mode and the second alerting mode.

15 Claims, 9 Drawing Sheets

| CHARACTER DATA | MUSICAL SCALE DATA |
|:---:|:---:|
| 0 | DO |
| 1 | MI |
| 2 | REST |
| 3 | FA |
| 4 | SO |
| 5 | LA |
| 6 | SI |
| 7 | DO |
| 8 | MI-RE-LA |
| 9 | SO |

| CHARACTER DATA | SCALE DATA | CHARACTER DATA | SCALE DATA |
|---|---|---|---|
| A | DO・RE | あ | LA・LA |
| B | DO・RE・DO | い | LA・SO |
| C | DO・MI | う | DO・MI |
| D | SI・RE・SO | え | SI・SO・SO・SO |
| ⋮ | ⋮ | ⋮ | ⋮ |
| W | DO・DO・DO・DO | よ | MI・RE |
| X | RE・RE・RE | わ | FA・FA |
| Y | MI・MI・MI | を | DO・SO |
| Z | SO・SO・SO | ん | SO・MI・RE・DO |

| CHARACTER DATA | SCALE DATA | CHARACTER DATA | SCALE DATA |
|---|---|---|---|
| ア | DO・FA | ! | DO |
| イ | FA | " | FA・FA |
| ウ | SO | # | SO・SI |
| エ | SI・RE | $ | LA・SO・MI |
| オ | SO・DO・MI | ⋮ | ⋮ |
| ⋮ | ⋮ | % | DO・DO・DO・DO |
| ヨ | SO・SO | & | RE・RE |
| ワ | DO・SO | ' | MI・SO・SO |
| ヲ | LA・MI・RE | ( | SO・LA・AL |
| ン | FA | ) | LA・SO |

| CHARACTER DATA | VIBRATION PATTERN |
|---|---|
| 0 | — · |
| 1 | · — · |
| 2 | · — · — |
| 3 | · · |
| 4 | — — — |
| 5 | — — · · |
| 6 | · — — |
| 7 | · — |
| 8 | — — |
| 9 | · — — · |
| A | · |
| B | — |
| C | · — |
| D | · · — |
| ⋮ | ⋮ |

FIG.9

COMMUNICATION APPARATUS AND ALERTING METHOD

BACKGROUND OF THE INVENTION

1. Field of the Invention

The present invention generally relates to a communication apparatus such as stationary or portable telephone, and in particular to an alerting method and apparatus for alerting a user by sound. vibration, and/or light to call arrival to the communication apparatus.

2. Description of the Related Art

There has been proposed a portable radio telephone which previously stores a plurality of alerting tones, for example, different melodies corresponding to different caller numbers. When an incoming call using Caller ID service occurs, the telephone makes a specific alerting sound corresponding to the caller number of the incoming call. However, the larger the number of caller numbers to be registered, the more troublesome the setting work. Further, an increasing number of caller numbers to be registered requires a larger amount of memory for storing them. Furthermore, since the number of kinds of alerting sounds available is usually limited, it is necessary in some case to assign a single alerting tone to different caller numbers. Therefore, there are cases where the user cannot determine from an alerting sound who is calling.

There has been also proposed a telephone set that is capable of simply identifying a caller through an incoming call tone. The telephone set stores a tone name in cross reference with a telephone number and makes an alerting sound according to a string of tone names corresponding to the caller number. However, each time an incoming call occurs, the alerting sound according to a string of tone names corresponding to the caller number is generated to alert the user to call arrival. There are cases where an ordinary ringer is sufficient for this purpose.

SUMMARY OF THE INVENTION

An object of the present invention is to provide a communication apparatus and alerting method which allow easy setting operation of alerting mode depending on how the communication apparatus is use.

Another object of the present invention is to provide a communication apparatus and an alerting method which can achieve a high degree of flexibility in setting an alerting mode.

According to an aspect of the present invention, a communication apparatus which has a function of receiving a source identification number when an incoming call occurs is comprised of: an alerting device; a memory storing a table containing alerting data associated with each of numeric characters; a selector for selecting one of a first alerting mode and a second alerting mode, the first alerting mode providing an alerting pattern which is determined by referring to the table depending on the source identification number, and the second alerting mode providing a preset alerting pattern; and a controller for controlling the alerting device such that, when the incoming call does not include the source identification number, the alerting device operates in the second alerting mode and, when the incoming call includes the source identification number, the alerting device operates in a selected one of the first alerting mode and the second alerting mode.

The communication apparatus preferably includes an input section for changing a correspondence of the table between the alerting data and each of the numeric characters. Further preferably, the selector and the input section are implemented by a keypad including a ten-key pad provided in the communication apparatus.

The alerting data associated with each of the numeric characters may be composed of at least one note of musical scale, wherein the alerting device is a speaker for producing an alerting sound. The alerting data may be composed of at least one pattern of vibration, wherein the alerting device is a vibrator for producing silent alerting vibration. Preferably, the alerting data may be composed of any combination of a dot-like duration vibration pattern and a dash-like duration vibration pattern.

According to another aspect of the present invention, a communication apparatus includes a first memory storing name data associated with each of registered identification numbers, the name data consisting of a plurality of alphabetic characters and a second memory storing a table containing alerting data associated with each of alphanumeric characters. The controller controls such that, when the incoming call includes the source identification number, the first memory is searched for name data associated with the source identification number and the alerting device generates an alerting pattern which is determined by referring to the table depending on the name data found in the first memory.

According to still another aspect of the present invention, a communication apparatus includes a first memory retrievably storing name data associated with each of registered identification numbers, the name data consisting of a plurality of alphabetic characters and a second memory retrievably storing alerting data associated with each of alphanumeric characters. Further, the communication apparatus is provided with first and second selectors. The first selector selects one of a first alerting mode and a second alerting mode the first alerting mode providing an alerting pattern which is determined depending on the source identification number and the second alerting mode providing a preset alerting pattern. The second selector selects one of a third alerting mode and a fourth alerting mode when the first alerting mode has been selected, the third alerting mode providing the alerting pattern which is determined by referring to the first and second memories depending on the source identification number, and the fourth alerting mode providing the alerting pattern which is determined by the second memory depending on the source identification number. The controller controls such that, when the incoming call does not include the source identification number, the alerting device operates in the second alerting mode and, when the incoming call Includes the source identification number, the alerting device operates in a selected one of the third alerting mode and the fourth alerting mode.

DETAILED DESCRIPTION OF THE PREFERRED EMBODIMENTS

Figure 1:
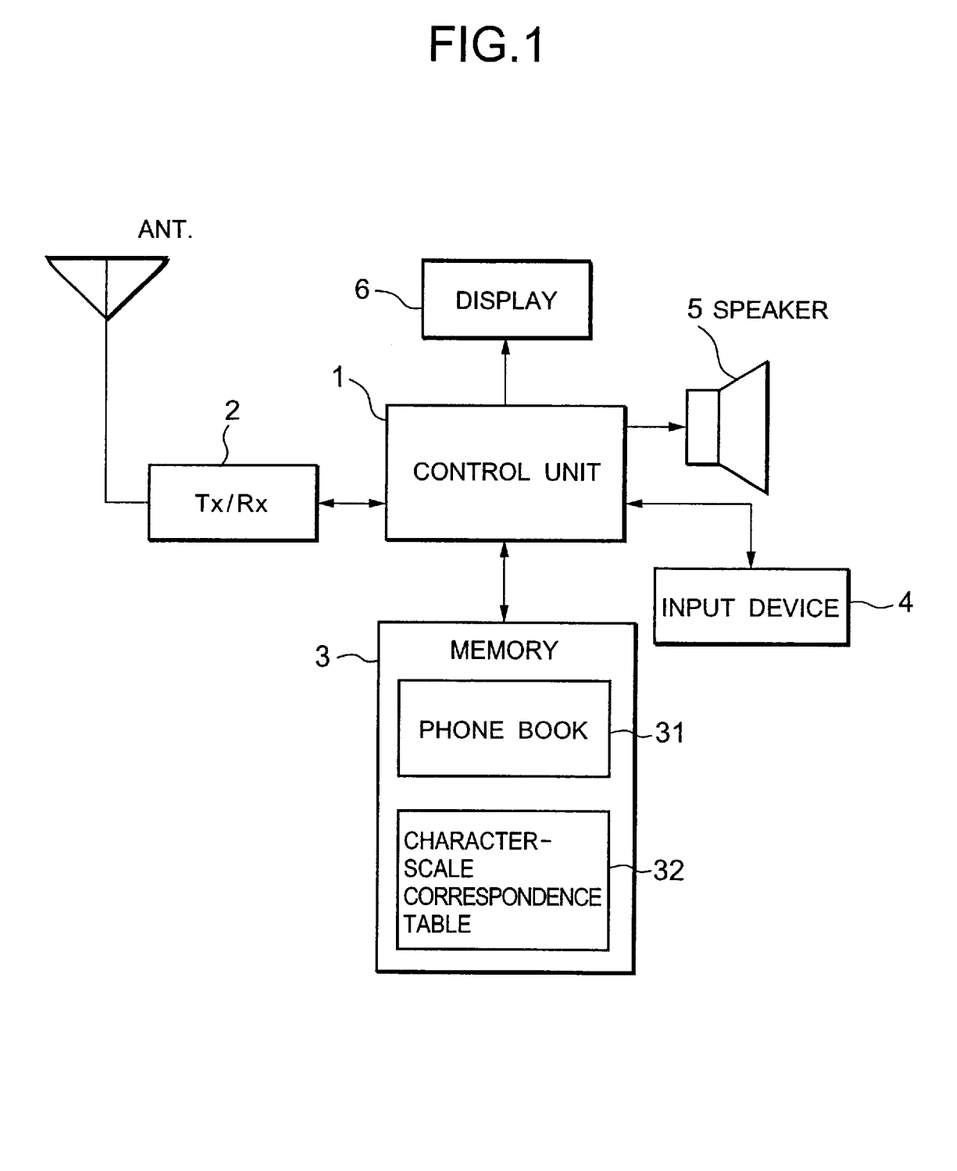
FIG. 1 is a block diagram showing a portable communication terminal employing an alerting method according to the present invention.

Referring to FIG. 1, a portable communication terminal is provided with a control unit 1 which controls the operations of the terminal including a data processing operation, a communication operation, and an alerting operation according to control programs stored in a read-only memory (not shown). The control unit 1 includes a program-controlled processor such as central processing unit (CPU) or digital signal processor (DSP). The control unit 1 is connected to a radio system 2, a memory 3, an input device 4, a speaker 5, and a display 6.

The radio system 2 is connected to an antenna and is composed of a radio transmitter and a radio receiver to perform radio communication under control of the control unit 1. The memory 3 includes a phone book area 31, a character-scale correspondence table 32, a user area for storing user information and the like, and a work area The input device 4 is a keypad including a ten-key pad that is used to select an alerting mode and calling information such as a phone number and character data. The speaker 5 is used to output an alerting sound under control of the control unit 1. The display 6 is a liquid crystal display to display necessary information on its screen.

The user can use the Input device 4 to select a desired alerting mode from an ordinary alerting mode and a simple alerting mode. In the case of the ordinary alerting mode, a preset alerting sound or vibration is generated when an incoming call occurs. In the case of the simple alerting mode, a pattern of alerting sound or vibration is generated depending on a caller phone number or a source identification number included in an incoming call.

Figure 2:
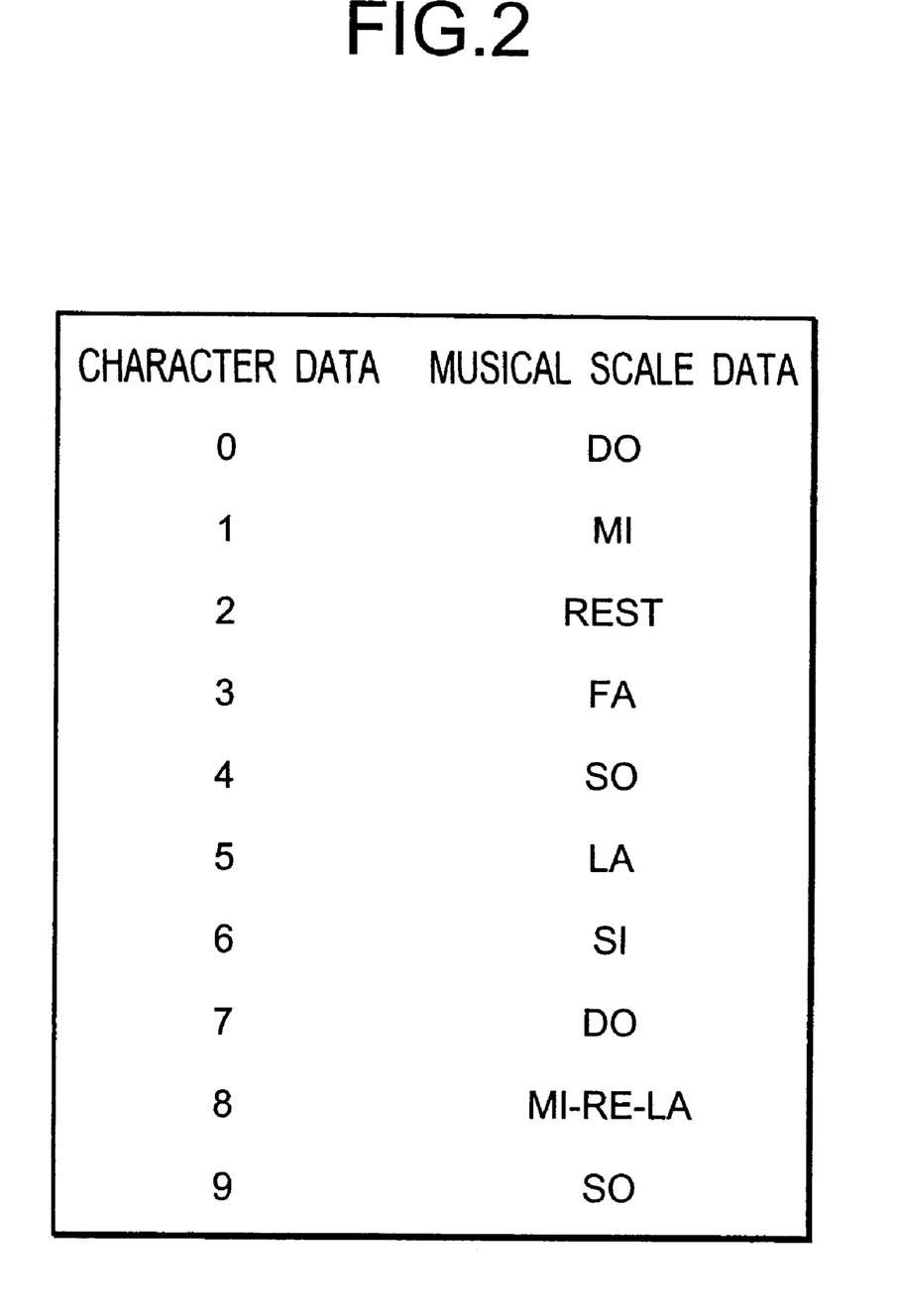
FIG. 2 is a diagram showing a character-scale correspondence table stored in a memory in the portable communication terminal according to a first embodiment of the present invention.

As shown in FIG. 2, more specifically, the character-scale correspondence table 32 of the memory 3 contains a correspondence between numeric characters 0–9 and musical scale data. In this embodiment, at least one note of scale data or rest data is assigned to a single character. For example, the scale data "do" and "mi" are assigned to numeric characters "0" and "1", respectively. The rest data is assigned to the numeric character "2". A combination of "mi", "re", and "la" is assigned to the numeric character "8". Therefore, in the case of a string of numeric characters "1", "2", and "3", three pieces of scale data "mi", Rest, and "fa" are sequentially read from the memory 3.

The correspondence between numeric characters 0–9 and musical scale data as shown in FIG. 2 is an example. A desired correspondence between them can be set by the user operating the input device 4 depending, on how the terminal is used.

Figure 3:
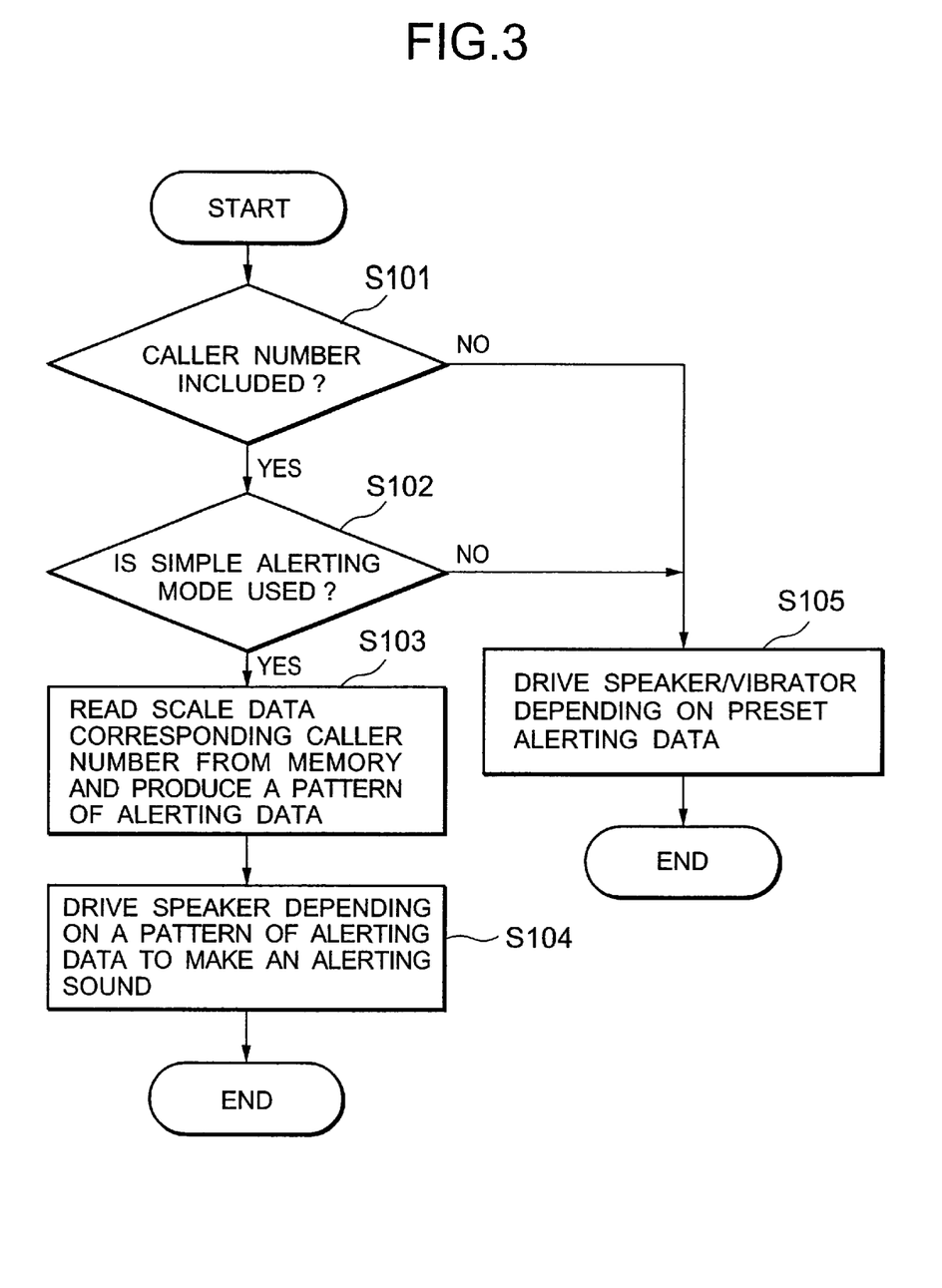
FIG. 3 is a flowchart showing an alerting mode setting operation in the first embodiment.

Referring to FIG. 3, when an incoming call occurs, the control unit 1 determines whether a caller phone number is included in the incoming call (step S101). In the case where the caller ID service has been set in the incoming call (YES in step S101), the control unit 1 stores the received caller phone number onto the memory 3 and then determines whether an alerting mode is set to the simple alerting mode (step S102).

In the case where the simple alerting mode has been set (YES in step S102), the control unit 1 reads scale data corresponding to the caller phone number from the character-scale correspondence table 32 of the memory 3 to produce a pattern of alerting data (step S103). More specifically, the control unit 1 reads digits of the caller phone number one by one and determines the scale data corresponding to each digit by referring to the character-scale correspondence table 32. In this manner, a string of scale data pieces corresponding respectively to the digits of the caller phone number is produced.

Thereafter. the control unit 1 drives the speaker 5 depending on the pattern of alerting data to generate an alerting sound (step S104). In other words, the caller number is converted into a pattern of scale data, which is further converted into alerting sound. For example, in the case where the caller number is "010-12-34567", the speaker 5 outputs a pattern of alerting sound: "do", "mi", "do", "mi", Rest, "fa", "so", "la", "si", and "do".

When no caller number is included in the incoming call (NO in step S101) or when the ordinary alerting mode has been set (NO in step S102), the control unit 1 drives the speaker or a vibrator depending on the preset alerting data (step S105).

Since a pattern of alerting data is produced depending on a caller number obtained by the caller ID service by referring to the character-scale correspondence table 32, the alerting sound for a different caller number becomes unique, helping the user to determine who is calling. Further, the alerting sound can be made without the need for the user to input the alerting data for different persons. Furthermore, the memory area dedicated to the alerting data is not needed, resulting in reduced amount of memory.

Since the user can previously determine through the input device 4 whether the simple alerting mode is used, a desired one of the simple and ordinary alerting modes can be selected depending on whether it is necessary to determine who is calling. In the case where the user wants to identify a caller, the simple alerting mode is selected.

A second embodiment will be described hereafter. According to the second embodiment, a pattern of alerting sound is generated depending on the name or the like of a caller determined from a received caller number. In this embodiment, the user can select a desired mode from the ordinary alerting mode and the simple alerting mode, and further can determine whether a name alerting mode is set through the input device 4.

Figure 4:
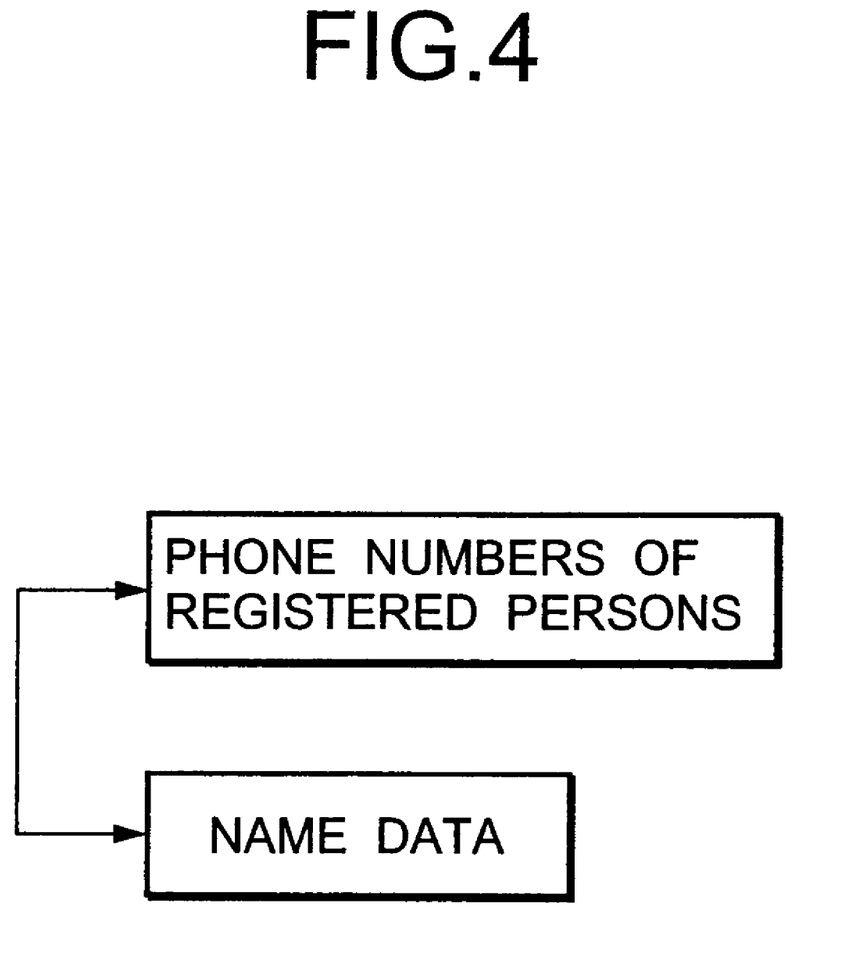
FIG. 4 is a diagram showing a number-name correspondence table stored in a memory in a portable communication terminal according to a second embodiment of the present invention.

Referring to FIG. 4, phone book data stored in the phone book area 31 is structured such that the phone numbers of registered persons are associated with name data of the persons. The name data is composed of alphabet characters. In Japanese, for example, the name data is composed of a combination of kanji characters and the phonetic alphabet (kana) characters thereof. To generate a pattern of alerting sound depending on alphabet characters and/or the phonetic alphabet (kana) characters, the following character-scale correspondence table is needed.

Figure 5:
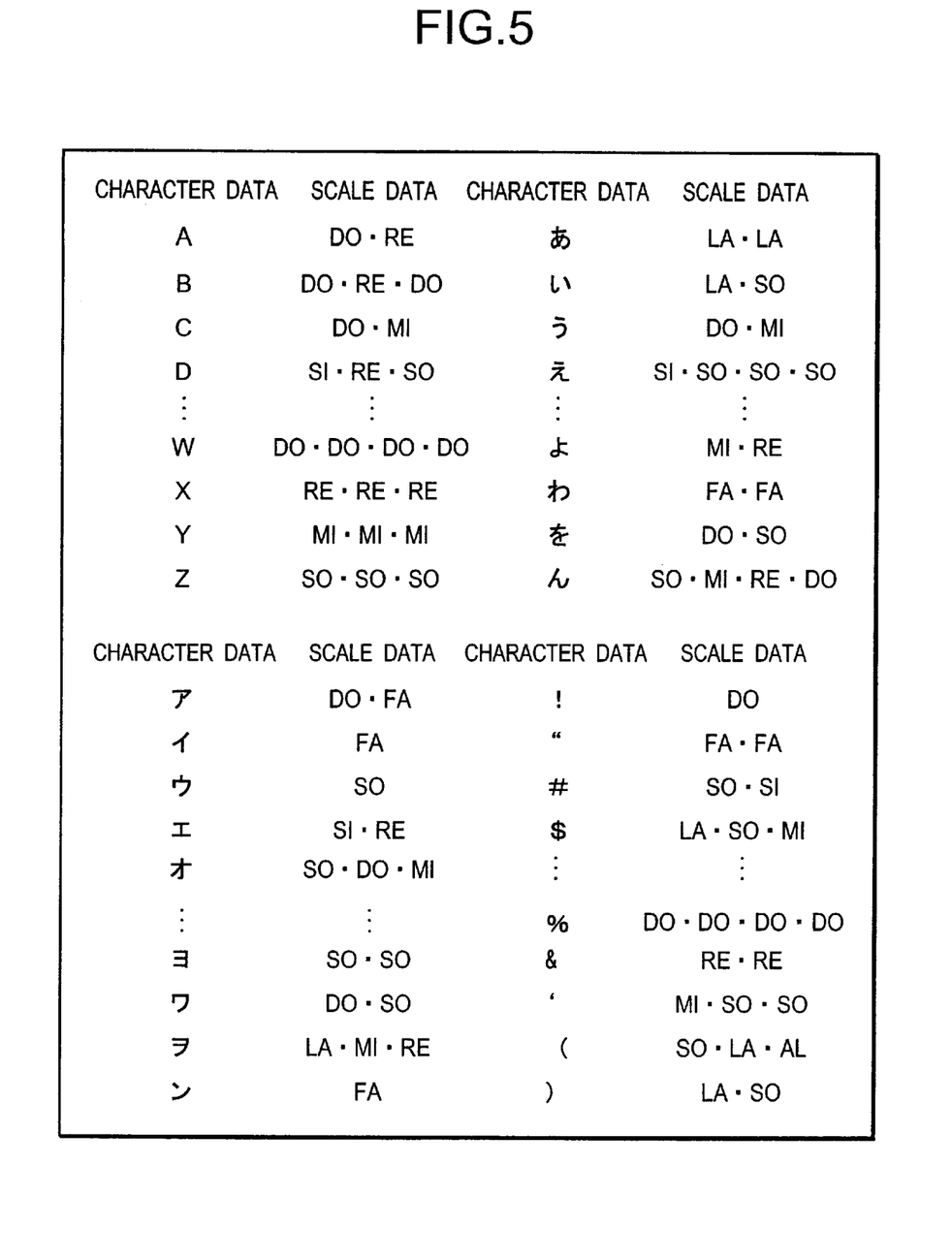
FIG. 5 is a diagram showing a character-scale correspondence table stored in the memory in the portable communication terminal according to the second embodiment.

Referring to FIG. 5, the character-scale correspondence table contains a correspondence between alphabet characters A–Z and musical scale data and a correspondence between symbol characters !, ", #, . . . and musical scale data. In Japanese, the character-scale correspondence table further contains a correspondence between Japanese phonetic alphabet characters and musical scale data. The correspondence between numeric characters 0–9 and musical scale data are contained in the character-scale correspondence table as shown in FIG. 2.

As shown in FIG. 5, at least one piece of scale data or rest data is assigned to a single character. For example, the alphabet character "A" is associated with a string of scale data "do" and "re". The Japanese phonetic alphabet (kana) character "ア" is associated with a string of scale data "do" and "fa". The symbol character "$" is associated with a string of scale data "la", "so", and "mi".

Figure 6:
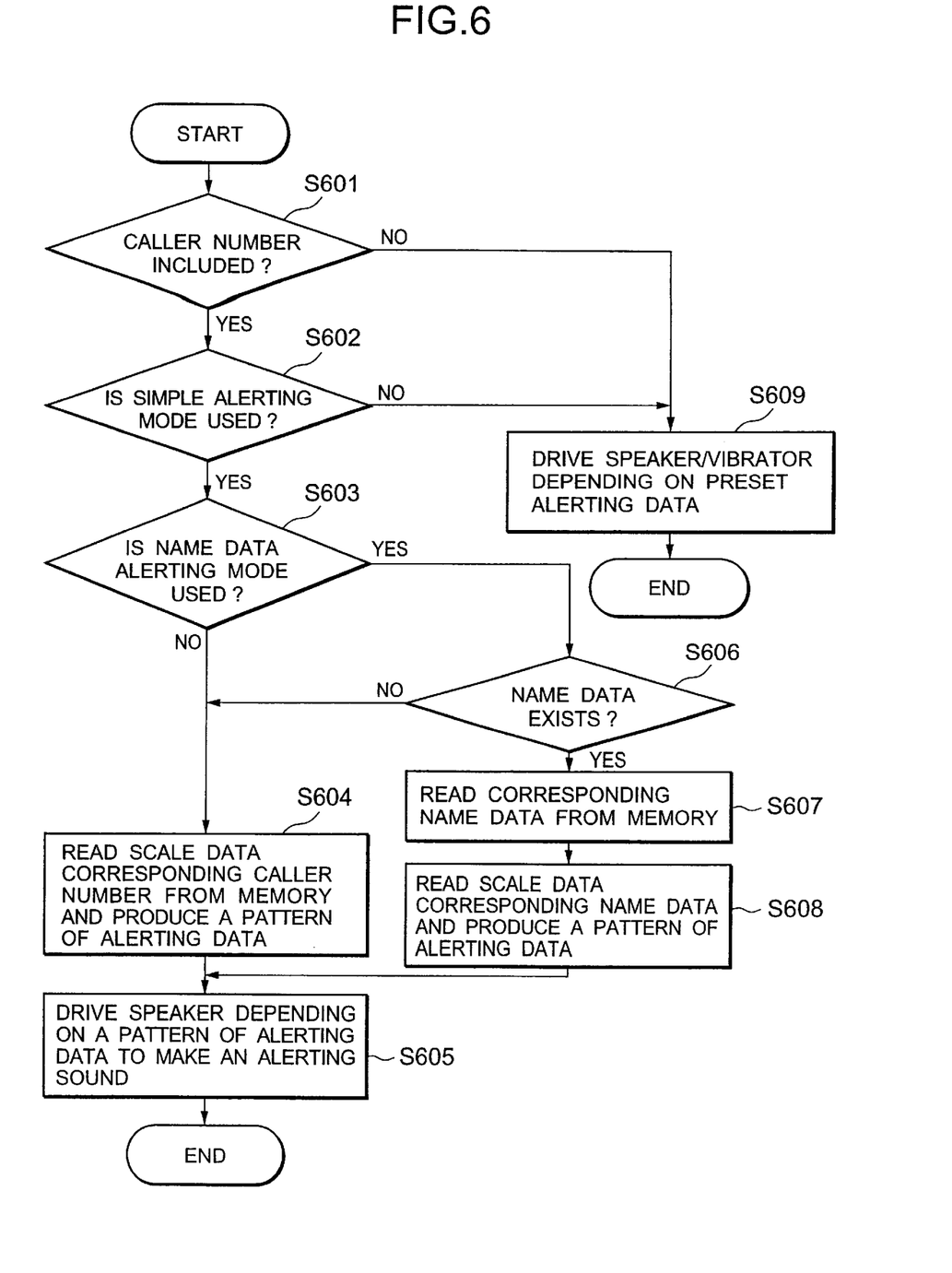
FIG. 6 is a flowchart showing an alerting mode setting operation in the second embodiment.

Referring to FIG. 6. when an incoming call occurs, the control unit 1 determines whether a caller phone number is included in the incoming call (step S601). In the case where the caller ID service has been set in the incoming call (YES in step S601), the control unit 1 stores the received caller phone number onto the memory 3 and then determines whether an alerting mode is set to the simple alerting mode (step S602).

In the case where the simple alerting mode has been set (YES in step S602), the control unit 1 further determines whether the name alerting mode is used (step S603). When the name alerting mode is not used (NO in step S603), the control unit 1 reads scale data corresponding to the caller phone number from the character-scale correspondence table 32 as shown in FIG. 5 to produce a pattern of alerting data (step S604). More specifically, the control unit 1 reads digits of the caller phone number one by one and determines the scale data corresponding to each digit by referring to the character-scale correspondence table 32. In this manner, a string of scale data pieces corresponding respectively to the digits of the caller phone number is produced. Thereafter, the control unit 1 drives the speaker 5 depending on the pattern of alerting data to generate an alerting sound (step S605).

In the case where the name alerting mode is used (YES in step S603), the control unit 1 searches the phone book for the received caller number to determines whether the name data associated with the received caller phone number exists (step S606). If no name data exists (NO in step S606), then control goes to the step S604 as described above. If a match is found in the phone book (YES in step S606). the control unit 1 reads the found name data from the phone book (step S607) and then reads scale data corresponding to the found name data from the character-scale correspondence table 32 as shown in FIG. 5 to produce a pattern of alerting data (step S608). More specifically, the control unit 1 reads alphabetical characters of the found name data one by one and determines the scale data corresponding to each character by referring to the character-scale correspondence table 32. In this manner. a string of scale data pieces corresponding respectively to the characters of the name data is produced. In Japanese, the phonetic alphabet characters (kana) are used as the name data. Thereafter, the control unit 1 drives the speaker 5 depending on the pattern of alerting data to generate an alerting sound (step S605).

When no caller number is included in the incoming call (NO in step S601) or when the ordinary alerting mode has been set (NO in step S602), the control unit 1 drives the speaker or a vibrator depending on the preset alerting data (step S609).

A third embodiment will be described later. According to the third embodiment, a vibrator is used to alert the user to call arrival as in the cases of the first and second embodiments. The user can select one or both of alerting vibration and sound through the input device 4.

Figure 7:
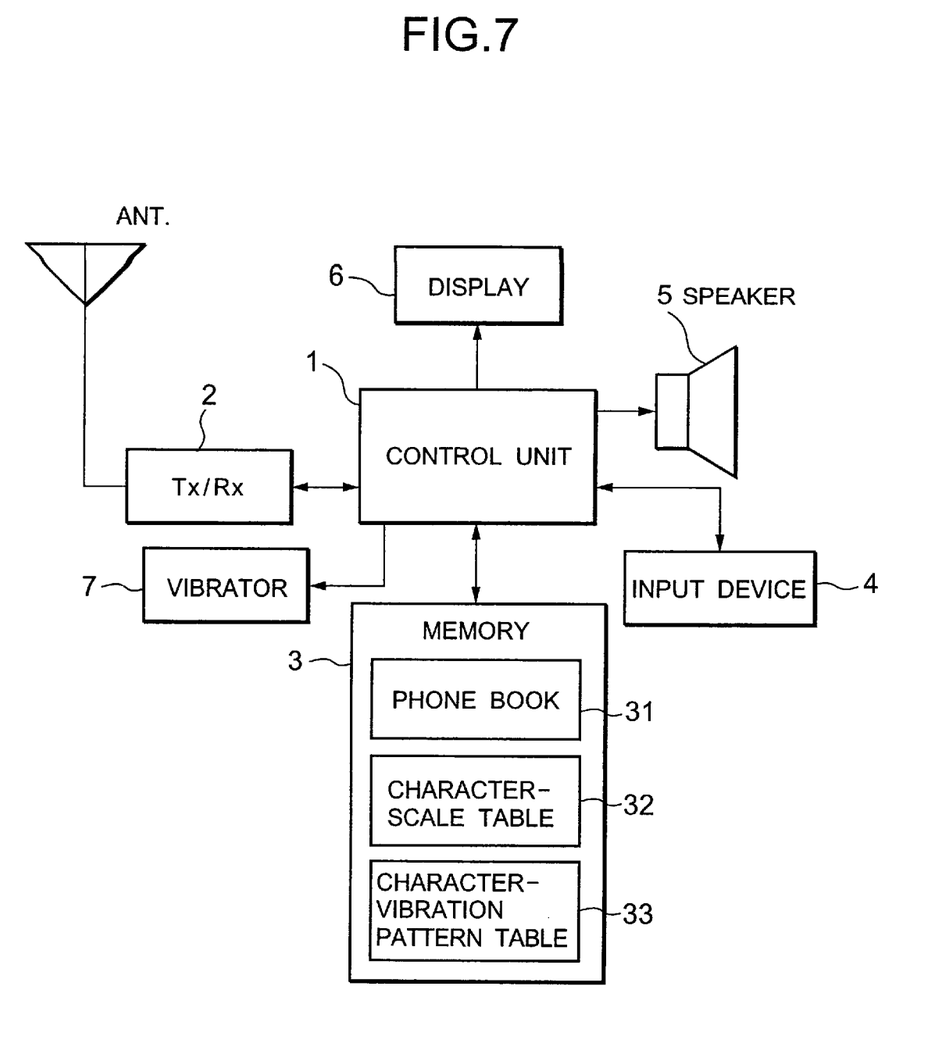
FIG. 7 is a block diagram showing a portable communication terminal employing an alerting method according to a third embodiment of the present invention.

Referring to FIG. 7, the terminal is provided with a vibrator 10 that is controlled by the control unit 1. The memory 3 stores a character-vibration pattern correspondence table 33 in addition to the phone book 31 and the character-scale correspondence table 32. Other circuit blocks denoted by reference numerals 1, 2,4–7 are the same as those shown in FIG. 1.

Figure 8:
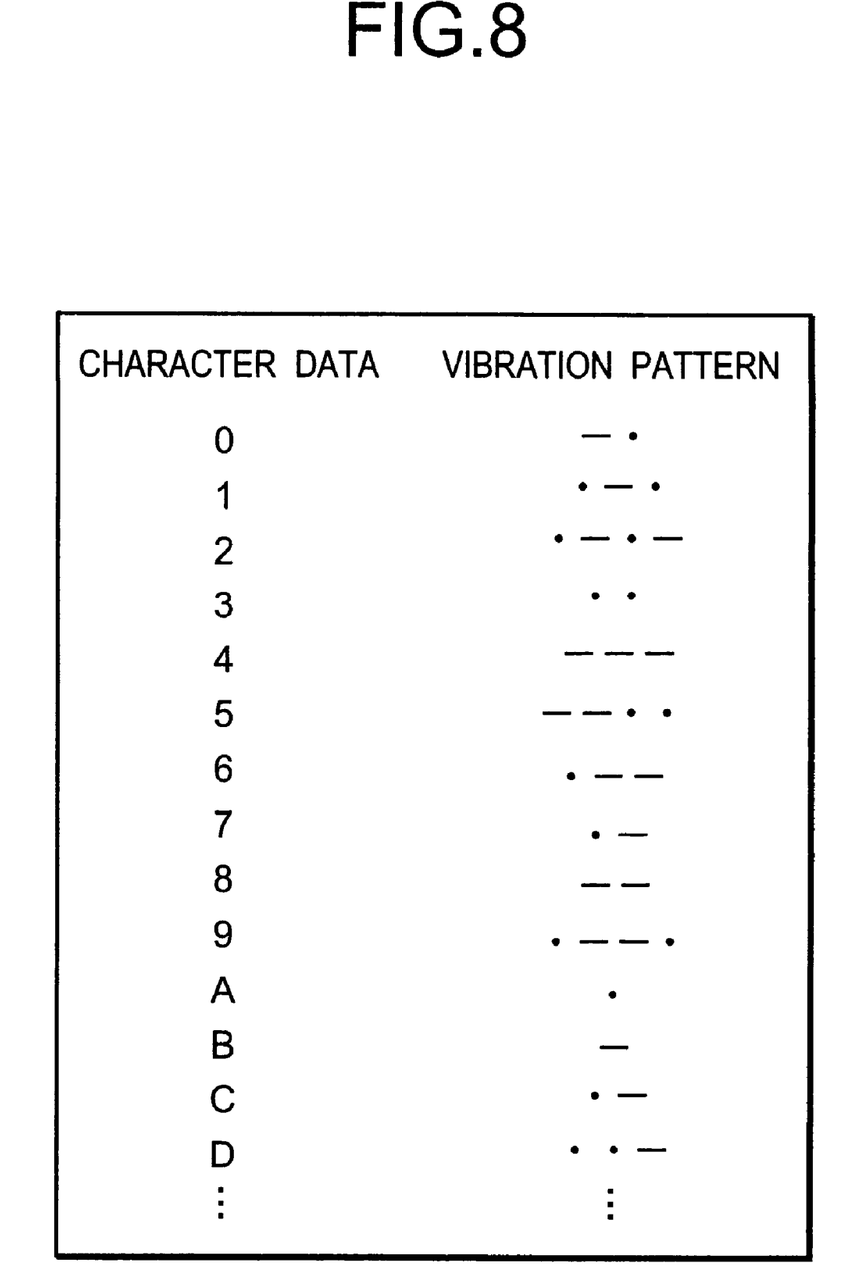
FIG. 8 is a diagram showing a character-vibration correspondence table stored in the memory in the portable communication terminal according to the third embodiment.

As shown in FIG. 8, more specifically, the character-vibration pattern correspondence table 33 of the memory 3 contains a correspondence between alphanumeric characters and vibration pattern data. In this embodiment, any combination of dot-like duration and dash-like duration vibration patterns is used to represent all the alphanumeric characters. For example, the numeral character "0" is represented by a series of "dash" and "dot". The numeral character "7" is represented by a series of "dot" and "dash". Therefore, as in the cases of the first and second embodiments, the caller number included in an incoming call is converted into a series of vibration patterns, which is further converted into alerting sound. Therefore, the same advantages can be obtained as described above.

The present invention is not only applied to the wireless communication device but also a wired communication device connectable to a communication line such as a telephone subscriber line.

Figure 9:
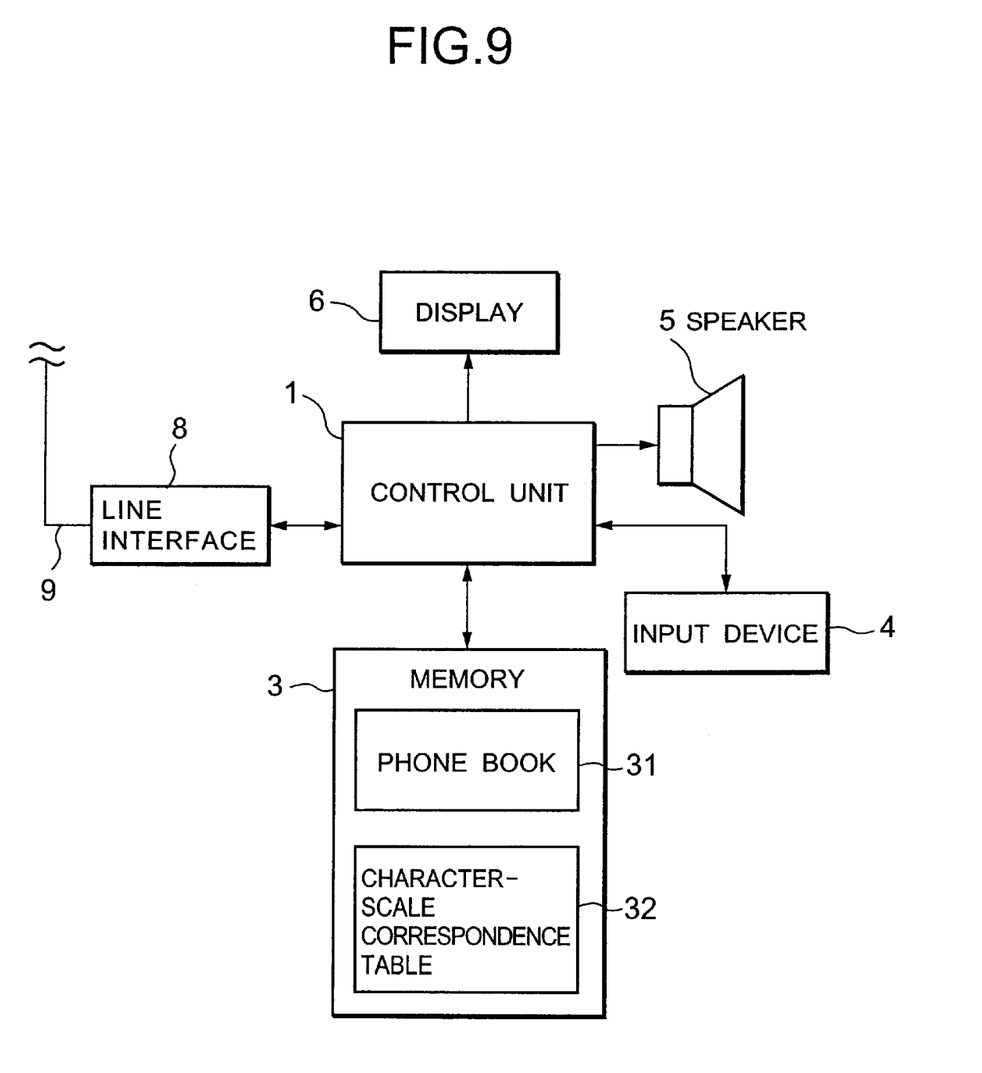
FIG. 9 is a block diagram showing a communication terminal employing an alerting method according to the present invention.

As shown in FIG. 9, the wired communication device is provided with a line interface 9 which can be connected to a wired line 9. In such a wired communication device, the same advantages as the wireless communication device can be obtained as described above.

As described above, since a pattern of alerting data is produced depending on a caller number obtained by the caller ID service by referring to the character-scale correspondence table 32, the alerting sound for a different caller number becomes unique, helping the user to determine who is calling. Further, the alerting sound can be made without the need for the user to input the alerting data for different persons. Furthermore. the memory area dedicated to the alerting data is not needed, resulting in reduced amount of memory Since the user can previously determine through the input device 4 whether the simple alerting mode is used, a desired one of the simple and ordinary alerting modes can be selected depending on whether it is necessary to determine who is calling. A vibrator can be also used to alert the user to call arrival based on a character-vibration pattern correspondence table containing predetermined combinations of dot and dash duration vibration patterns.

What is claimed is:

1. A communication apparatus which has a function of receiving a source identification number when an incoming call occurs, comprising:

an alerting device;

a memory storing a table containing alerting data associated with each of numeric characters;

a selector for selecting one of a first alerting mode and a second alerting mode, the first alerting mode providing an alerting pattern which is determined by referring to the table depending on the source identification number, and the second alerting mode providing a preset alerting pattern;

a controller for controlling the alerting device such that, when the incoming call does not include the source identification number, the alerting device operates in the second alerting mode and, when the incoming call includes the source identification number, the alerting device operates in a selected one of the first alerting mode and the second alerting mode, and an input section for changing a correspondence of the table between the alerting data and each of the numeric characters.

2. The communication apparatus according to claim 1, wherein the selector and the input section are implemented by a keypad including a ten-key pad provided In the communication apparatus.

3. A communication apparatus which has a function of receiving a source identification number when an incoming call occurs, comprising:

an alerting device, the alerting device being a speaker for producing an alerting sound;

a memory storing a table containing alerting data associated with each of numeric characters, the alerting data associated with each of the numeric characters being composed of at least one note of musical scale;

a selector for selecting one of a first alerting mode and a second alerting mode, the first alerting mode providing an alerting pattern which is determined by referring to the table depending on the source identification number, and the second alerting mode providing a preset alerting pattern; and a controller for controlling the alerting device such that, when the incoming call does not include the source identification number, the alerting device operates in the second alerting mode and, when the incoming call includes the source identification number, the alerting device operates in a selected one of the first alerting mode and the second alerting mode.

4. A communication apparatus which has a function of receiving a source identification number when an incoming call occurs, comprising:

an alerting device, the alerting device being a vibrator for producing silent alerting vibration;

a memory storing a table containing alerting data associated with each of numeric characters, the alerting data associated with each of the numeric characters being composed of at least one pattern of vibration;

a selector for selecting one of a first alerting mode and a second alerting mode, the first alerting mode providing an alerting pattern which is determined by referring to the table depending on the source identification number, and the second alerting mode providing a preset alerting pattern; and a controller for controlling the alerting device such that, when the incoming call does not include the source identification number, the alerting device operates in the second alerting mode and, when the incoming call includes the source identification number, the alerting device operates in a selected one of the first alerting mode and the second alerting mode.

5. The communication apparatus according to claim 4, wherein the alerting data is composed of any combination of a dot-like duration vibration pattern and a dash-like duration vibration pattern.

6. A communication apparatus which has a function of receiving a source identification number when an incoming call occurs, comprising:

an alerting device, the alerting device being a speaker for producing an alerting sound;

a first memory storing name data associated with each of registered identification numbers, the name data consisting of a plurality of alphabetic characters;

a second memory storing a table containing alerting data associated with each of alphanumeric characters, the alerting data associated with each of the alphanumeric characters being composed of at least one note of musical scale; and a controller controlling such that, when the incoming call includes the source identification number, the first memory is searched for name data associated with the source identification number and the alerting device generates an alerting pattern which is determined by referring to the table depending on the name data found in the first memory.

7. A communication apparatus which has a function of receiving a source identification number when an incoming call occurs, comprising:

an alerting device, the alerting device being a vibrator for producing silent alerting vibration;

a first memory storing name data associated with each of registered identification numbers, the name data consisting of a plurality of alphabetic characters;

a second memory storing a table containing alerting data associated with each of alphanumeric characters, the alerting data associated with each of the alphanumeric characters being composed of at least one pattern of vibration; and a controller controlling such that, when the incoming call includes the source identification number, the first memory is searched for name data associated with the source identification number and the alerting device generates an alerting pattern which is determined by referring to the table depending on the name data found in the first memory.

8. The communication apparatus according to claim 7, wherein the alerting data is composed of any combination of a dot-like duration vibration pattern and a dash-like duration vibration pattern.

9. A communication apparatus which has a function of receiving a source identification number when an incoming call occurs, comprising:

an alerting device, a first memory retrievably storing name data associated with each of registered identification numbers, the name data consisting of a plurality of alphabetic characters;

a second memory retrievably storing alerting data associated with each of alphanumeric characters;

a first selector for selecting one of a first alerting mode and a second alerting mode, the first alerting mode providing an alerting pattern which is determined depending on the source identification number, the second alerting mode providing a preset alerting pattern;

a second selector for selecting one of a third alerting mode and a fourth alerting mode when the first alerting mode has been selected, the third alerting mode providing the alerting pattern which is determined by referring to the first and second memories depending on the source identification number, and the fourth alerting mode providing the alerting pattern which is determined by the second memory depending on the source identification number; and a controller controlling such that, when the incoming call does not include the source identification number, the alerting device operates in the second alerting mode and, when the incoming call includes the source identification number, the alerting device operates in a selected one of the third alerting mode and the fourth alerting mode.

10. The communication apparatus according to claim 9, wherein when the incoming call includes the source identification number, the first memory is searched for name data associated with the source identification number and the alerting device generates an alerting pattern which is determined by referring to the second memory depending on the name data found in the first memory.

11. The communication apparatus according to claim 9, further comprising:

an input section for changing a correspondence between the alerting data and each of the numeric characters in the second memory.

12. The communication apparatus according to claim 11, wherein the first and second selectors and the input section are implemented by a keypad including a ten-key pad provided in the communication apparatus.

13. An alerting method in a communication apparatus which has a function of receiving a source identification number when an incoming call occurs, comprising the steps of:

storing a table containing alerting data associated with each of numeric characters;

selecting one of a first alerting mode and a second alerting mode, the first alerting mode providing an alerting pattern which is determined by referring to the table depending on the source identification number, and the second alerting mode providing a preset alerting pattern;

operating an alerting device in the second alerting mode when the incoming call does not include the source identification number; and operating the alerting device in a selected one of the first alerting mode and the second alerting mode when the incoming call includes the source identification number, the alerting data associated with each of the numeric characters being composed of at least one: note of musical scale, the alerting device being a speaker for producing an alerting sound.

14. An alerting method in a communication apparatus which has a function of receiving a source identification number when an incoming call occurs, comprising the steps of:

storing a first table containing name data associated with each of registered identification numbers, the name data consisting of a plurality of alphabetic characters;

storing a second table containing alerting data associated with each of alphanumeric characters;

searching the first table for name data associated with the source identification number when the incoming call includes the source identification number; and generating an alerting pattern which is determined by referring to the second table depending on the name data found in the first table, the alerting data associated with each of the numeric characters being composed of at least one note of musical scale.

15. An alerting method in a communication apparatus which has a function of receiving a source identification number when an incoming call occurs, comprising steps of:

retrievably storing a first table containing name data associated with each of registered identification numbers, the name data consisting of a plurality of alphabetic characters;

retrievably storing a second table containing alerting data associated with each of alphanumeric characters;

selecting by means of a first selector one of a first alerting mode and a second alerting mode, the first alerting mode providing an alerting pattern which is determined depending on the source identification number, the second alerting mode providing a preset alerting pattern;

selecting by means of a second selector one of a third alerting mode and a fourth alerting mode when the first alerting mode has been selected, the third alerting mode providing the alerting pattern which is determined by referring to the first and second tables depending on the source identification number, and the fourth alerting mode providing the alerting pattern which is determined by the second table depending on the source identification number;

operating an alerting device in the second alerting mode when the incoming call does not include the source identification number; and operating the alerting device in a selected one of the third alerting mode and the fourth alerting mode when the incoming call includes the source identification number.

* * * * *